(12) United States Patent
Raasz et al.

(10) Patent No.: US 12,008,887 B2
(45) Date of Patent: Jun. 11, 2024

(54) METHOD OF FIRE DETECTOR COVER DETECTION AND CORRESPONDING FIRE DETECTION APPARATUS

(71) Applicant: Carrier Corporation, Palm Beach Gardens, FL (US)

(72) Inventors: Pawel Raasz, Gdańsk (PL); Piotr Wolnowski, Gdańsk (PL)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/686,954

(22) Filed: Mar. 4, 2022

(65) Prior Publication Data

US 2022/0284800 A1 Sep. 8, 2022

(30) Foreign Application Priority Data

Mar. 8, 2021 (EP) .................................. 21161230

(51) Int. Cl.
*G08B 29/02* (2006.01)
*G01S 17/04* (2020.01)
*G01V 1/00* (2006.01)

(52) U.S. Cl.
CPC .............. *G08B 29/02* (2013.01); *G01S 17/04* (2020.01); *G01V 1/001* (2013.01)

(58) Field of Classification Search
CPC ...... G08B 29/02; G08B 17/10; G08B 29/043; G08B 29/14; G08B 5/22; G08B 17/103; G01S 17/04; G01V 1/001; G01V 11/00; G01V 1/00; G01V 8/10
See application file for complete search history.

(56) References Cited

U.S. PATENT DOCUMENTS

| 5,867,095 | A | 2/1999 | Klein et al. |
| 5,936,533 | A | 8/1999 | Bernal et al. |
| 8,610,586 | B2 | 12/2013 | Shimada et al. |
| 8,958,571 | B2 | 2/2015 | Kwatra et al. |
| 9,959,748 | B2 | 5/2018 | Moffa |
| 10,304,318 | B1 | 5/2019 | Xu et al. |
| 2009/0267755 | A1 | 10/2009 | Ropke |

FOREIGN PATENT DOCUMENTS

| EP | 1475761 A1 | 11/2004 |
| EP | 1547041 A2 | 6/2005 |
| EP | 2189956 A1 | 5/2010 |
| EP | 2214146 A1 | 8/2010 |
| EP | 2492882 A1 | 8/2012 |
| EP | 3134885 A1 | 3/2017 |

(Continued)

OTHER PUBLICATIONS

European Search Report for Application No. 21161230.4; dated Aug. 26, 2021; 10 Pages.

*Primary Examiner* — Daryl C Pope
(74) *Attorney, Agent, or Firm* — CANTOR COLBURN LLP (57) ABSTRACT

A fire detection apparatus includes a fire detector (1) including an integrated sounding device (5) that is configured to emit a sound (7) from the fire detector (1) and that is further configured to detect reverberation of the emitted sound resulting from a cover (9) placed over the fire detector (1). The detected reverberation can be used to determine that the fire detector (1) has been covered.

14 Claims, 3 Drawing Sheets

(56) References Cited

FOREIGN PATENT DOCUMENTS

| | | | |
|---|---|---|---|
| EP | 3452998 A1 | 3/2019 | |
| EP | 3613027 A1 | 2/2020 | |
| ES | 2842725 T3 * | 7/2021 | ............. G08B 17/00 |
| JP | 2009075997 A | 4/2009 | |
| JP | 4656101 B2 | 3/2011 | |
| WO | 2017190770 A1 | 11/2017 | |
| WO | 2018226593 A1 | 12/2018 | |

* cited by examiner

METHOD OF FIRE DETECTOR COVER DETECTION AND CORRESPONDING FIRE DETECTION APPARATUS

FOREIGN PRIORITY

This application claims priority to European Patent Application No. 21161230.4, filed Mar. 8, 2021, and all the benefits accruing therefrom under 35 U.S.C. § 119, the contents of which in its entirety are herein incorporated by reference.

TECHNICAL FIELD OF INVENTION

The present invention relates to a fire detection apparatus that is capable of detecting whether a fire detector of the apparatus has been covered. The invention further relates to a method of fire detector cover detection, and a computer programme product comprising instructions for carrying out the method when executed on a data processing apparatus.

BACKGROUND OF THE INVENTION

Fire detectors are employed, both in commercial settings (i.e. office buildings, warehouses, factories etc.) and in residential settings, to enable the detection of fire. Fire detectors are reliant on an exposure to a surrounding environment to function properly, for example to allow for the detection of smoke particles indicating a fire. If fire detectors are covered, either wholly or partly, to prevent exposure to the environment in which they are situated in then they will not function properly.

There are a number of reasons why a fire detector may be covered. For instance, prior to installation and to protect the component parts of the fire detector a fire detector might be covered with a cap or the like. After installation, the cover is supposed to be removed to allow the fire detector to properly function; however the removal of the cover can be overlooked. Covers may also be placed over fire detectors during refurbishment or maintenance work in the environment in which the fire detector is situated to prevent a false alarm being generated through the detection of, e.g., dust at the fire detector. Covers may also be placed over the fire detector where a person, illicitly or otherwise, may want to prevent detection, e.g. whilst smoking in the environment of the fire detector.

It is therefore desirable to ascertain whether a fire detector has been covered to ensure proper functioning thereof. Typically, this has involved a manual visual inspection procedure. This can be time-consuming, and may be particularly inappropriate in settings where there are a large number (e.g. hundreds or thousands) of fire detectors.

An alternative solution to ascertaining whether a fire detector has been covered is disclosed in WO 2017/190770 A1. The primary embodiments of this document relate to fire detectors within a commercial setting and disclose using an LED based emission and detection system installed within the fire detector to detect whether the fire detector has been covered. The LED emits light from the fire detector which, if a cover has been placed over the fire detector, is reflected back toward the fire detector. The reflected light is detected by the installed light detector and this detection can be used to determine that a cover has placed over the fire detector. If there is no reflection of emitted light detected it would seemingly indicate that the fire detector has not been covered.

WO 2017/190770 A1 also discloses an alternative embodiment that comprises an audible emission and detection system installed in place of the LED emission and detection based system. The audible emission and detection system comprises a speaker installed in the fire detector along with a separate sound detector. The sound detector detects a feature of the sound initiated by the speaker, such as a decibel level or time duration on receipt of the sound to determine whether a cover has been placed on the fire detector.

There are certain shortcomings with the cover detection system disclosed in WO 2017/190770 A1, in particular with regard to accuracy and speed of detection. The cover detection system of WO 2017/190770 A1 is also only viable for use in a commercial setting, and is not applicable more generally (e.g. for domestic and commercial settings).

As such, improved and alternative fire detector cover detection is desired.

SUMMARY OF THE INVENTION

In a first aspect, the invention provides a fire detection apparatus comprising: a fire detector comprising an integrated sounding device that is configured to emit a sound and that is configured to detect reverberation of the emitted sound resulting from a cover placed over the fire detector.

The first aspect is advantageous since it makes use of the integrated sounding device (a commonplace integral feature in a wide variety of fire detectors which can be configured to provide for various other functions of the fire detector) as the basis of cover detection. The fire detector may hence be configured to use the sounding device as a part of a test procedure for detecting a cover, e.g. based on the nature of the detected reverberation. Thus, the already integral componentry of the fire detector can be use as the basis of fire cover detection and there is no, or a significantly reduced, requirement for additional componentry in order to be able to detect a cover.

The sounding device is a single component that is configured to both emit a sound from the fire detector and to detect reverberation of the emitted sound resulting from a cover placed over the fire detector. Thus, the sounding device acts as both a sounding device and a sound detector. In this way, the additional componentry required for cover detection using the fire detection apparatus of the first aspect is further minimised.

For example, it may only be needed to make minor hardware modifications to enable measurement of a parameter at the sounding device in order to give it the function of sound detection. In some cases the changes required may be implemented by software modifications alone, if the necessary connections are already present in existing hardware. In this way minimal (or no) additional componentry need be added to the fire detector to allow for cover detection other than that which would be present in any event, and thus the proposed detection method can be employed on a standard type fire detection apparatus comprising a fire detector having a sounding device through a reconfiguration of the existent sounding device.

As mentioned above, the integrated sounding device may also be used for additional functionality to that of cover detection. This may particularly be the case where the invention is to be employed through minor reconfigurations and adjustments to an existing fire detector as discussed above. For instance, the integrated sounding device may be configured to issue an alarm signal from the fire detector on detection of a fire. Optionally, the integrated sounding device may be configured to issue a sound to indicate a low power status of the fire detector and/or to indicate disconnection from a primary power source for the fire detector. Optionally, the integrated sounding device may be configured to issue a sound to indicate the initiation or termination of a 'hush' function (i.e. the temporary deactivation of the alarm functionality of the fire detector). The integrated sounding device may be configured to issue a sound, upon manual activation or periodically, to indicate the proper functioning of the fire detector. Optionally the integrated sounding device provides any and/or all of the above functionality for the fire detector, and the fire detector may be configured to operate the sounding device in the way set out above, such as via suitable control functions implemented by a controller of the fire detector.

The integrated sounding device may be the only sounding device in the fire detector, and optionally can be configured to provide any and/or all of the above functionality for the fire detector.

The fire detector may not require any further sounding devices and the integrated sounding device may be the sole sounding device in the fire detector.

The detection of a cover with the fire detection apparatus of the first aspect is based on the reverberation of the emitted sound. In a situation where a cover has been placed over the fire detector, sound emitted from the sounding device can be reflected by the cover and/or by other parts, e.g. a housing of the fire detector, and this reflection of sound results in in the emitted sound reverberating at the fire detector for a longer period of time if a cover is present as compared to a scenario where no cover has been placed over the fire detector. Thus, a length of time that reverberated sound is detected by the sounding device at the fire detector may be used to detect and determine whether the fire detector has been covered. The fire detection apparatus may be configured to determine this length of time and to provide an indication as to whether a cover is present or not, for example a controller of the fire detection apparatus may be configured to determine this length of time based on measurements of electrical parameters at the sounding device, as in the examples discussed below.

The detection of a cover based on sound is advantageous since it allows for fast cover detection. By way of comparative example, practical implementations of light based cover detection systems typically require a filtering time of approximately 30 seconds in order to accurately determine that the light received at the detector results from reflection from the cover. In contrast, the detection of a cover based on sound typically takes in the order of milliseconds (e.g. 20 ms), and thus allows for faster cover detection.

The cover placed over the fire detector may be any item used to cover the fire detector, either wholly or partly, from an exterior of the fire detector in order to prevent it from carrying out its proper function. The cover may be made from foil, film, fabric, plastics or other materials. The cover may be a cap as is typically placed over a fire detector prior to its installation or during refurbishment.

The fire detection apparatus may comprise a controller, which may be the controller referenced above. The controller may be an additional component of the fire detector or an external component thereto. Alternatively, the controller may be an integrated part of the fire detector and may be of a similar type to controllers included in prior art fire detectors, aside from the modifications needed to implement the presently proposed new features. Such modifications may advantageously be primarily or solely software modifications, e.g. firmware modifications. The controller may be in communication with the sounding device. The controller may be configured to determine whether a cover has been placed over the fire detector based on receipt of a signal from the sounding device that is indicative of the reverberation detected at the sounding device, for example by a measurement and/or transmission of an electrical parameter relating to sound detected at the sounding device, such as a voltage or current.

The controller may be configured to determine whether a cover has been placed over the fire detector based on the length of time of the signal (and thereby the length of time of reverberation). The length of time of the signal may be the length of time that the signal exceeds a threshold value. To say this another way, the length of time of the signal may be the length of time before the signal falls/dies away below the threshold value such that it no longer exceed this threshold value. There may be intermittent/temporary drops in the signal received at the controller where the signal falls below the threshold value and subsequently back above the threshold. The length of time of the signal is however not affected by these intermittent/temporary drops. The end of the length of time of the signal is determined when the signal will no longer (and will not again) reach in excess the threshold value.

The signal may be an electrical signal in the form of a current and/or a voltage. Thus, the length of time of the signal may be determined based on comparing the received current and/or voltage with a reference current and/or voltage. The length of time of the signal may thus be considered to terminate when the current and/or voltage received at the controller no longer excess the threshold current and/or voltage.

The sounding device is configured to detect for the reverberations of the emitted sound resulting from a cover placed over the fire detector. The sounding device may additionally detect other sounds/reverberations, for instance sounds originating from external to the fire detector, the initial emission of the sound from the sounding device and/or the reverberations of the emitted sound that occur in the fire detector in absence of a cover placed over the fire detector. The controller, which is optionally in communication with the sounding device, may be able to distinguish between these different sounds/reverberations detected at the sounding device and the reverberation of the emitted sound resulting from a cover placed over the fire detector. This may be based on the signal received from the sounding device, and may be based on a comparison of the length of time of the signal with a reference time. The reference time may be an expected length of time that reverberations last after emission of the sound from the sounding device when a cover is placed over the fire detector, for example a threshold time over which a cover is deemed to be present. The reference time may be an expected length of time that reverberations last after emission of the sound from the sounding device when a cover is not placed over the fire detector, for example a threshold time under which a cover is deemed to be absent. These expected lengths of time may have been determined experimentally.

The controller may provide for additional functionality of the fire detection apparatus, and in particular additional functionality of the fire detector. For instance, the controller may be configured to control the integrated sounding device to issue a sound indicative of a low power status of the fire detector and/or to indicate disconnection from a primary power source for the fire detector. Optionally, the controller may be configured to control the integrated sounding device to issue a sound indicative of the initiation or termination of a 'hush' function (i.e. the temporary deactivation of the alarm functionality of the fire detector).

Optionally, the controller may be configured to control the integrated sounding device to issue a sound, upon manual activation or periodically, to indicate the proper functioning of the sounding device, and optionally may be configured to determine that the sounding device is functioning properly based on receipt of a signal from the sounding device indicative of the issuance of said sound. A controller providing this functionality is known from prior art fire detection apparatus. Thus, a minor reconfiguration of the software of such a fire detection apparatus, with little or no change required to the hardware, can allow such fire detection apparatus to provide for cover detection in accordance with the first aspect.

The sounding device may be a buzzer. Buzzers are commonplace integral features within fire detectors, particularly fire detectors for use in a domestic setting. Thus, the fire detector of the first aspect may use the already present buzzer within the fire detector to enable cover detection. Alternative sounding devices can also be used however, for instance a bell, horn or the like, features which are also commonplace in fire detectors.

The sounding device may be a device that functions based on the piezoelectric effect (e.g. a piezoelectric transducer). This is particularly advantageous in embodiments where the sounding device is a buzzer since these devices are commonly already based on the piezoelectric effect. Moreover, it is known how a single piezoelectric device can provide the dual functionality of sound emission and detection as is required of the sounding device.

Alternatively, the sounding device may be an electromechanical device that is not reliant on the piezoelectric effect. It is also well known how such electromechanical devices can provide dual functionality of emission and detection as required by the sounding device.

The fire detector may additionally comprise a light emitter and a light detector. The light emitter may be configured to emit a light from the fire detector and the light detector may be configured to detect the emitted light after having been reflected back to the fire detector by a cover placed over the fire detector.

The additional inclusion of a light emitter and a light detector provides another alternative methodology for determining whether the fire detector has been covered. Thus, the additional inclusion of the light emitter and detector provides improved redundancy of cover detection (e.g. in the event that the light based or sound based system were to malfunction). Moreover, the inclusion of the light emitter and light detector in addition to the sounding device can provide for improved accuracy of cover detection. This is because the fire detector is capable of detecting a cover via either light or sound, and therefore where one of the modalities of detection fails (e.g. because the cover does not reflect sound) then the other modality should still allow for cover detection (e.g. because the cover does reflect light).

The light emitter and/or light detector may be in communication with the controller or a separate controller. As such, the fire detection apparatus may comprise a separate controller in communication with the light emitter and/or the light detector. This separate controller may separate to, an additional component of, or an integral component of the fire detector. The, or the separate, controller may be configured to control the light emitter to emit the light. The, or the separate, controller may be configured to determine whether a cover has been placed over the fire detector based on receipt of a signal from the light detector indicative of detection of the reflected light.

The sounding device may be configured to detect for reverberations based on acoustic pressure or a change in acoustic pressure.

The sound configured to be emitted by the sounding device may be a short pulse of sound. The sounding device may be configured to emit the sound periodically. The controller may be configured to control the sounding device to emit the sound periodically.

In a second aspect, there is provided a method of detecting whether a fire detector of a fire detection apparatus has been covered, the fire detector comprising an integral sounding device, the method comprising: emitting a sound using the sounding device; and detecting, with the sounding device, for reverberation of the emitted sound resulting from a cover placed over the fire detector.

The fire detection apparatus and/or fire detector used in the method of the second aspect may be in accordance with the fire detection apparatus of the first aspect and/or the fire detector described in connection with the first aspect as set out above, and may include any optional features thereof. The method of the second aspect may include steps pertaining to the optional functionality of the fire detection apparatus and/or fire detector described in relation to the first aspect.

The fire detector may be in communication with a controller of the fire detection apparatus. The method may comprise sending a signal from the sounding device that is indicative of the reverberation detected at the sounding device. The method may further comprise determining with the controller whether a cover has been placed over the fire detector based on receipt of the signal from the sounding device, optionally based on the length of time of the signal.

The length of time of the signal may be the length of time that the received signal exceeds a threshold value.

The step of determining whether a cover has been placed over the fire detector with the controller may comprise comparing the length of time of the signal with a reference time to determine that a cover has been placed over the fire detector. The reference time may be based on an expected reverberation time of the emitted sound when a cover is or is not placed over the fire detector The method of the second aspect may comprise emitting a light from the fire detector using a light emitter. The method may further comprise detecting the emitted light after having been reflected back to the fire detector by a cover using a light detector.

In a third aspect of the invention, there is provided a computer programme product comprising instructions that when executed on a data processing apparatus in communication with an integral sounding device of a fire detector of a fire detection apparatus will configure the fire detection apparatus to carry out the method of the second aspect.

The fire detection apparatus may be the fire detection apparatus of the first aspect. The fire detector may be in accordance with the fire detector described above in relation to the first aspect. The data processing apparatus may be the controller.

In a fourth aspect of the invention, there is provided a method of detecting whether a fire detector of a fire detection apparatus has been covered, the fire detector comprising a sounding device, a sound detector, a light emitter and a light detector, the method comprising: emitting a sound with the sounding device; emitting a light with the light emitter; detecting, with the sound detector, for reverberation of the emitted sound resulting from a cover placed over the fire detector; and detecting with the light detector for the light having been reflected back to the fire detector by a cover placed over the fire detector.

The method of the fourth aspect may use compatible embodiments of the fire detection apparatus of the first aspect.

BRIEF DESCRIPTION OF THE DRAWINGS

Certain preferred embodiments of the invention will now be described, by way of example only, with reference to the accompanying drawings, in which.

DETAILED DESCRIPTION OF THE INVENTION

Figure 1:
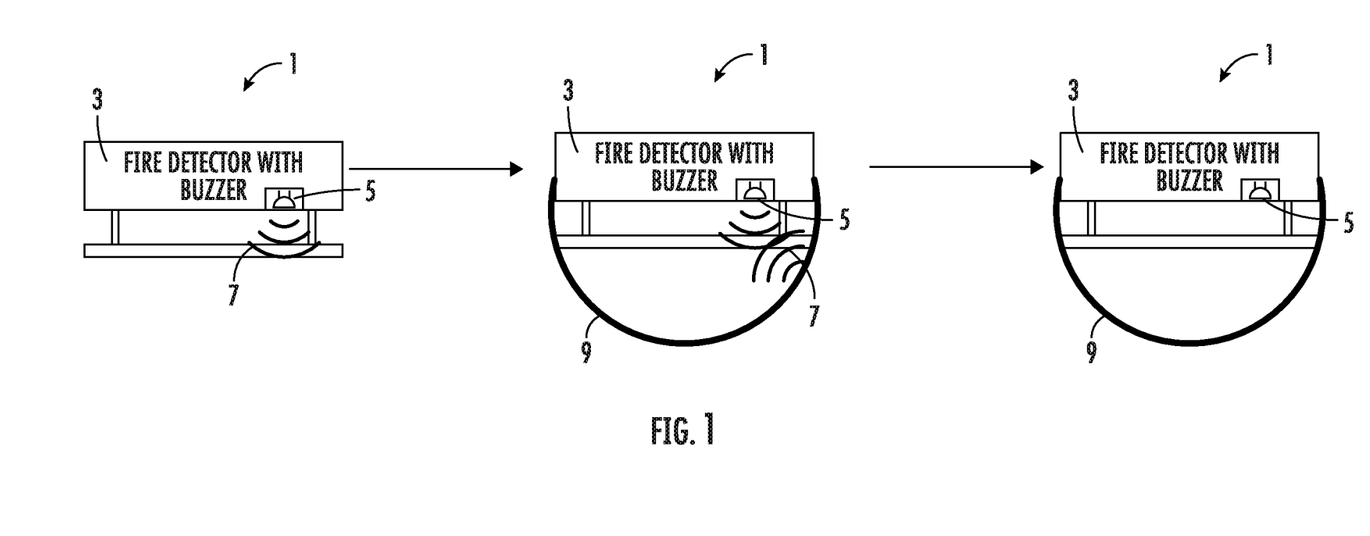
FIG. 1 is a schematic of a fire detector both with and without a cover placed over the top of the fire detector.

FIG. 1 show a fire detection apparatus comprising a fire detector 1, the fire detector having a housing 3 and a sounding device 5 positioned in the housing 3. The sounding device 5 is in the form of a buzzer 5. A controller (not shown) is in communication with the buzzer 5 and is configured to control the buzzer 5 to emit a short pulse of sound 7. The controller is also configured to receive a signal from the buzzer 5 indicative of any reverberation of sound detected at the buzzer 5.

In use the buzzer 5 is controlled by the controller to emit a short pulse of sound 7. Subsequent to the emission of the sound pulse 7, the buzzer 5 detects for any reverberation of sound by detecting a change in acoustic pressure. The change in acoustic pressure detected at the buzzer 5 causes the generation of a signal which is sent from the buzzer 5 to the controller. The controller then determines based on the length of time of this received signal (as discussed in further detail below) whether a cover has been placed over the top of the fire detector 1.

In the leftmost portion of FIG. 1 the fire detector 1 is shown without a cover placed over the top. In this arrangement, after the sound pulse 7 has been emitted by the buzzer 5, the buzzer 5 detects any resultant reverberations. A signal is produced at the buzzer 5 based on the resultant reverberations detected and this is sent to the controller. Since no cover is placed over the fire detector 1 the reverberations from the emission of the sound pulse 7 die away quickly. As such, the resultant signal indicative of the detected reverberated sound sent to the controller has a short length of time. Thus, a comparison at the controller with a reference time indicative of the expected length of time of a signal received from the buzzer 5 where no cover has been placed over the fire detector 1 allows the controller to determine that no cover has been placed over the fire detector.

In the middle portion of FIG. 1 the fire detector 1 is shown with a cover in the form of a cap 9 placed over the top. In this scenario, as in the above scenario, after the sound pulse 7 has been emitted by the buzzer 5, the buzzer 5 detects any resultant reverberations. A signal is produced at the buzzer 5 based on the resultant reverberations detected and this is sent to the controller. Since the cap 9 is placed over the fire detector 1, the surface of the cap 9 acts to reflect the emitted sound pulse 7 back toward the fire detector. This reflection causes the sound to reverberate for a longer period of time within the fire detector 1. This prolongs reverberation at the fire detector after emission of the sound pulse 7. Thus, compared to the above scenario, the reverberations at the fire detector 1 from the emission of the sound pulse 7 die away slowly. As such, the resultant signal indicative of the detected reverberated sound sent to the controller is comparatively longer in time. Thus, a comparison of the received signal in this scenario at the controller with the reference time allows the controller to determine that a cover 9 has been placed over the fire detector 1 because the signal has a length of time longer than the reference time.

The rightmost portion of FIG. 1 shows the fire detector 1 subsequent to the determination that a cover 9 has been placed over the fire detector 9. At this time the controller can issue an alarm signal to an operative to alert that a cover 9 is placed over the fire detector 1 and requires removal for the proper functioning of the fire detector 1.

Figure 2:
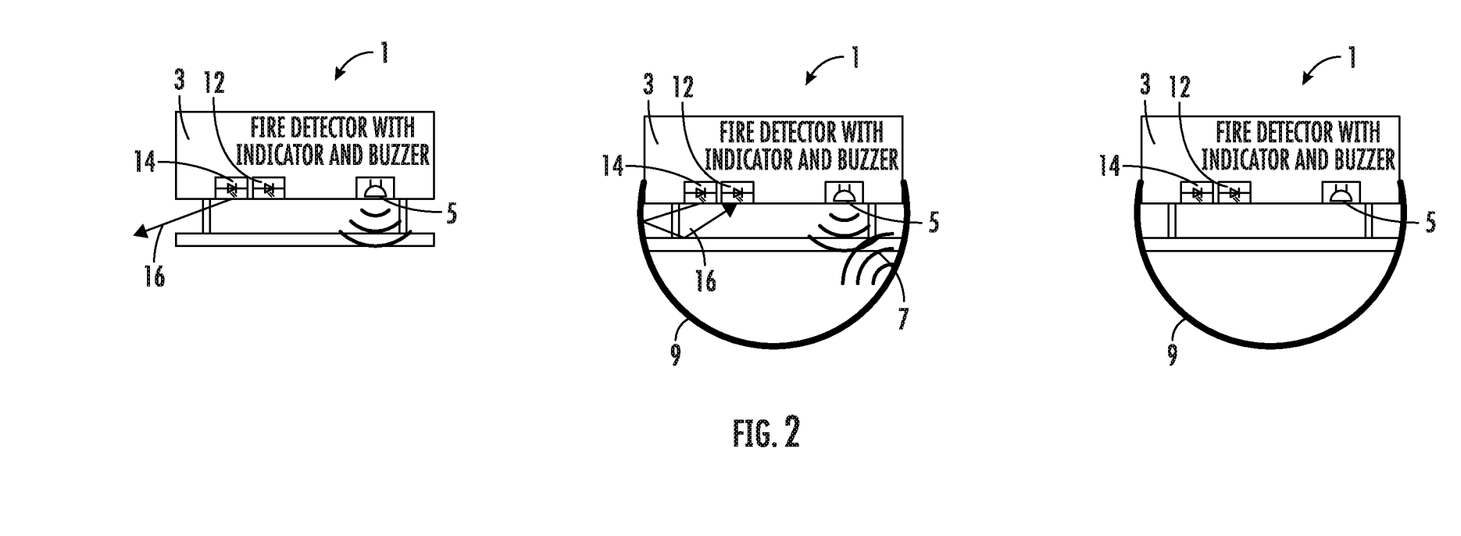
FIG. 2 is a schematic of an alternative fire detector both with and without a cover placed over the top.

FIG. 2 is a correspondent figure to FIG. 1 and depicts a fire detection apparatus comprising an alternative fire detector 10. The fire detector 10 is correspondent to the fire detector 1 in every way except that it additionally includes a light detector 12 and light emitter 14. The light detector 12 and the light emitter 14 are each in communication with the controller. The controller is configured to control the light emitter 14 to emit a pulse of light 16. The controller is also configured to receive a signal from the light detector 12 indicative of any reflected light detected at the detector 12.

In use the buzzer 5 of the detector 10 is controlled by the controller to emit a short pulse of sound 7. Subsequent to the emission of the sound pulse 7 the buzzer 5 detects for any reverberation of sound by detecting a change in acoustic pressure. The change in acoustic pressure detected at the buzzer 5 causes the generation of a signal which is sent from the buzzer 5 to the controller. The controller then determines based on the length of time of this received signal (as discussed in further detail below) whether a cover has been placed over the top of the fire detector 1. Thus the fire detector 10 functions in a corresponding manner to the fire detector 1. However, in addition, the light emitter 14 is controlled by the controller to emit the pulse of light 16. Subsequent to the emission of the light pulse 16, the detector 12 detects for emitted light after having been reflected back to the fire detector 10.

In the leftmost portion of FIG. 2 the fire detector 10 is shown without a cover placed over the top. In this arrangement, the fire detector 10 carries out an emission and detection using a sound pulse correspondent to that described above with reference to the leftmost portion of FIG. 1 to determine that a cap has not been placed over the fire detector 10. However, additionally in this arrangement the controller controls the light emitter 14 to emit a light pulse 16. Since no cover is placed over the fire detector 10 no reflection of light pulse 16 occurs. As such, the light detector 12 does not receive any reflected light and thus no signal is produced by the light detector 12. The absence of a signal received from the light detector 12 at the controller allows the controller to determine that no cover has been placed on the fire detector 10.

In the middle portion of FIG. 2 the fire detector 10 is shown with a cover in the form of a cap 9 placed over the top. In this arrangement, the fire detector 10 carries out an emission and detection using a sound pulse correspondent to that described above with reference to the middle portion of FIG. 1 to determine that a cap 9 has been placed over the fire detector 10. However, additionally in this arrangement the controller controls the light emitter 14 to emit a light pulse

16. After emission, the light pulse 16 is reflected off the cap 9 and is received at the light detector 12. On receipt of the reflected light, the light detector 12 produces a signal which is sent to the controller. On receipt of the signal the controller can determine that the light has been reflected and thus a cover 9 has been placed over the top of the fire detector 10.

The rightmost portion of FIG. 2 shows the fire detector 10 subsequent to the determination that a cover 9 has been placed over the fire detector 10. At this time the controller can issue an alarm signal to an operative to alert that a cover 9 is placed over the fire detector 1 and requires removal for the proper functioning of the fire detector 10.

The fire detector 10 is advantageous in that it provides for two separate modalities (light based and sound based) of cover detection, thus allowing for improved redundancy of cover detection (in the event one of these modalities fail) and improved accuracy (in the event that one of the modalities cannot detect the type of cover 9 that has been placed over the fire detector 10).

Figure 3:
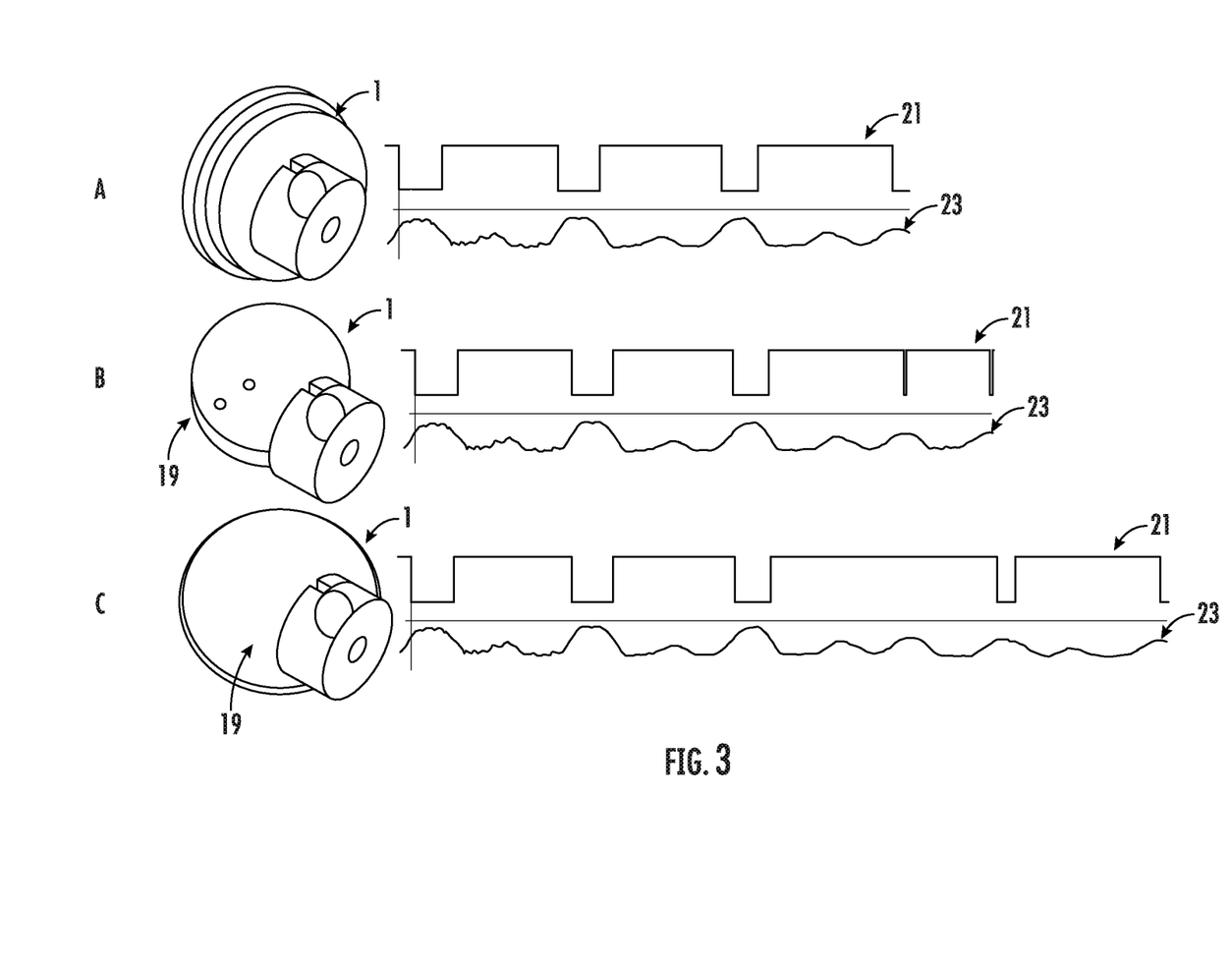
FIG. 3 depicts fire detectors, some of which having covers placed on top, along with correspondent graphs showing the reverberation time of these fire detectors after a sound has been emitted therefrom.

FIG. 3 shows the fire detector 1 of FIG. 1 in three different scenarios. In the first scenario, A, the fire detector 1 is uncovered. In the second scenario, B, the fire detector 1 has been covered with a foil cover 19. In the third scenario, C, the fire detector 1 is covered by the cap 9.

The graphs in FIG. 3 adjacent each of the depicted scenarios of the fire detector 1 represent the reverberation time of the sound pulse 7 emitted from each fire detector 1. The lower plot 23 in each graph represents the signal produced by the buzzer 5 upon detection of the reverberation whilst the upper plot 21 shows the resultant comparison at the controller between the signal and a threshold value. That is, a binary (digital) signal is formed indicating whether the received signal falls above or below the determined threshold.

It can be seen from a comparison of the three scenarios A-C that the fire detector 1 without a cover (A) has the shortest reverberation time and thus produces the signal 23 with the shortest time length, whilst the fire detector 1 with the cap 9 (C) has the longest reverberation time and thus produces the signal with longest time length. The fire detector 1 with the foil cover 19 (C) has an intermediate reverberation time as compared to scenarios A and C. A comparison of the length of the received signal 23 can therefore allow for a determination of whether a cover has been placed over the fire detector 1.

What is claimed is:

1. A fire detection apparatus comprising:
 a fire detector (1, 10) comprising an integrated sounding device (5) that is configured to emit a sound (7) from the fire detector (1, 10) and that is further configured to detect reverberation of the emitted sound resulting from a cover (9) placed over the fire detector (1,10);
 wherein the fire detector (10) comprises a light emitter (14) and a light detector (12), wherein the light emitter (14) is configured to emit a light from the fire detector (10) and wherein the light detector (12) is configured to detect the emitted light after having been reflected back to the fire detector (10) by a cover (9) placed over the fire detector (10);
 wherein the sounding device (5) detects a change in acoustic pressure in order to detect the reverberation.

2. The fire detection apparatus as claimed in claim 1 comprising a controller, wherein the controller is in communication with the sounding device (5), and wherein the controller is configured to determine whether a cover (9) has been placed over the fire detector (1, 10) based on receipt of a signal from the sounding device (5) that is indicative of the reverberation detected at the sounding device (5).

3. The fire detection apparatus as claimed in claim 2, wherein the controller is configured to determine that a cover (9) has been placed over the fire detector (1, 10) based on the length of time of the signal.

4. The fire detection apparatus as claimed in claim 3, wherein the length of time of the signal is the length of time that the received signals falls above a threshold value.

5. The fire detection apparatus as claimed in claim 3, wherein the controller is configured to compare the length of time of the signal with a reference time to determine that a cover (9) has been placed over the fire detector (1, 10).

6. The fire detection apparatus as claimed in claim 5, wherein the reference time is based on an expected length of time that reverberations last after emission of the sound from the sounding device (5) when a cover (9) is not placed over the fire detector (1, 10).

7. The fire detection apparatus as claimed in claim 1, wherein the integrated sounding device (5) is an integrated buzzer (5).

8. The fire detection apparatus as claimed in claim 1, wherein the sounding device (5) is a device that functions based on the piezoelectric effect.

9. The fire detection apparatus as claimed in claim 1, wherein the sounding device (5) is an electromechanical device that is not reliant on the piezoelectric effect.

10. A method of detecting whether a fire detector (1, 10) has been covered, the fire detector (1, 10) comprising an integral sounding device (5), the method comprising:
 emitting a sound (7) using the sounding device (5); and
 detecting, with the sounding device (5), for reverberation of the emitted sound resulting from a cover (9) placed over the fire detector (1, 10);
 wherein the fire detector (10) further comprises a light emitter (14) and a light detector (12), and wherein the method comprises:
 emitting a light (16) from the fire detector (1, 10) using the light emitter (14); and
 detecting with the light detector (12) for the light having been reflected back to the fire detector (10) by a cover (9) placed over the fire detector (10);
 wherein the sounding device (5) detects a change in acoustic pressure in order to detect the reverberation.

11. A non-transitory computer program product comprising instructions that when executed on a data processing apparatus in communication with an integral sounding device (5) of a fire detector (1, 10) of a fire detection apparatus will configure the fire detection apparatus to carry out the method of claim 10.

12. A method of detecting whether a fire detector (1, 10) of a fire detection apparatus has been covered, the fire detector (1, 10) comprising a sounding device (5), a sound detector, a light emitter (14) and a light detector (12), the method comprising: emitting a sound (7) with the sounding device (5); emitting a light with the light emitter (14); detecting, with the sound detector, for reverberation of the emitted sound resulting from a cover (9) placed over the fire detector (1, 10); and detecting with the light detector (12) for the light having been reflected back to the fire detector (1, 10) by a cover (9) placed over the fire detector (1, 10);
 wherein the sound detector detects a change in acoustic pressure in order to detect the reverberation.

13. A non-transitory computer programme product comprising instructions that when executed on a data processing apparatus in communication with a sounding device (5), a sound detector, a light emitter (14) and a light detector (12)

of a fire detector (1, 10) of a fire detection apparatus will configure the fire detection apparatus to carry out the method of claim 12.

14. A fire detection apparatus comprising: a fire detector (1, 10) comprising a sounding device (5) that is configured to emit a sound (7) from the fire detector (1, 10), a sound detector configured to detect reverberation of the emitted sound resulting from a cover (9) placed over the fire detector (1,10), a light emitter (14) and a light detector (12), wherein the light emitter (14) is configured to emit a light from the fire detector (10) and wherein the light detector (12) is configured to detect the emitted light after having been reflected back to the fire detector (10) by a cover (9) placed over the fire detector (10);

wherein the sound detector detects a change in acoustic pressure in order to detect the reverberation.

\* \* \* \* \*